UNITED STATES PATENT OFFICE.

EMORY V. DONELSON, OF BALTIMORE, MARYLAND, ASSIGNOR TO THE CRYSTAL RICE MILLING COMPANY, OF MARION, INDIANA.

METHOD OF TREATING CEREALS AND PRODUCTS.

SPECIFICATION forming part of Letters Patent No. 470,140, dated March 1, 1892.

Application filed August 9, 1889. Serial No. 320,267. (No specimens.)

*To all whom it may concern:*

Be it known that I, EMORY V. DONELSON, a citizen of the United States, residing at Baltimore, in the State of Maryland, have invented certain new and useful Improvements in Methods of Treating Cereals and Products, of which the following is a specification.

My invention has for its object to obtain from two or more cereals—such as rice, corn, and barley—a product whose elements or constituents—starch, dextrine, and sugar—shall be developed into a soluble state or condition ready for use as an alimentary substance, or for brewers' use. It is a well-known fact that the cellular tissues of the starch-crystals or flakes of cereals differ, and that when the tissues are broken down by heat and moisture and the starch contained therein developed to a point of solubility and then dried the crystals or flakes formed present such shapes that by the aid of the microscope the several cereals can be distinguished from each other. It is also known that it requires more heat to develop the crystals or flakes of some cereals than is required for others. Thus corn requires a greater exposure to heat than rice to develop its starch-crystals.

Heretofore various methods have been employed to develope the soluble starch, dextrine, and sugar of cereals, and the soluble starch, dextrine, and sugar of different cereals have been commingled or mixed after the developing process has been completed, the resulting product in such cases being such that the different crystals or flakes could be readily distinguished as belonging to corn or rice, as the case might be, and therefore I term such a process as nothing more than a "mechanical mixture" and not a chemical change, which I shall call a "true combination or assimilation," in which it is impossible to determine the identity of the different cereals.

It is desirable for brewers' and other uses to employ the soluble products of two or more cereals, and it is important that the constituents of each cereal shall be thoroughly developed. The proper degree of heat and moisture applied for the appropriate length of time will perfectly develop the starch of any cereal to the point of its readiest solubility; but these conditions of heat and time must be varied to suit each particular cereal, as some cereals yield to the treatment mentioned much more readily than others. I propose a method that will accomplish the best results by the simultaneous treatment of two or more cereals mixed or commingled before treatment, whereby the starchy matter of the several cereals used will be assimilated or blended as opposed to the simple mechanical mixture heretofore used.

My invention consists of a process and a product, as hereinafter described, and set forth in the claims.

The several grains to be treated should first have the hull or covering of cellular tissue and the germinal portion removed by any known method, each kind of grain being thus treated separately. The grain should be reduced or broken, but not ground. This may be accomplished by any of the mills for doing such work. The several different kinds of grain thus prepared are then mixed and the mixture subjected to the action of moisture and heat, preferably steam, at alternating temperatures. The particular degrees of temperature, as well as the time during which each temperature shall be employed, must be governed to suit each of the several kinds of cereals used. For instance, for rice and corn, a lower temperature will be employed for the rice and a higher for the corn. These two temperatures will be employed for the mixture alternately.

By the term "alternating temperatures" I mean that the cereals shall be first subjected to a temperature of about 160° Fahrenheit. Then, as suddenly as can be accomplished, run it up to 212° or 240°, and then run it back to 212°, or less. This changing or alternating of the temperature accomplishes the results above referred to, as the lower temperatures are sufficient for the rice and the higher temperatures develop the starch crystals or flakes of the corn. It is impossible for me to state exactly either the degree of moisture or time required for my process, as that is governed by the grain, as when it is new it contains more moisture and is softer than at any other time, and consequently it would require less moisture and take less time in the process. Approximately, however, the least time that would be required would be fifteen minutes, and the greatest would be thirty minutes. The cereals must not be reduced to a pulpy mass, but each particle of grain should retain its individual form and yet be cooked soft. For brewers who may wish to do their own processing the product at this stage is ready for the vat, and for such purposes my method thus far described is complete.

When it is desired to produce a product that may be kept for any length of time, the following additional steps must be taken: At the stage of the process last mentioned and while the grain particles are hot, they should be subjected to a cold blast, or an application of cold water sufficient only to chill or toughen them on the exterior. The grain particles should then be immediately subjected to the treatment of rolls or mills for the purpose of forming granules, curls, or flakes, as may be desired, and finally dried by any convenient means.

By the above-described process the starch particles of the different cereals used will be thoroughly assimilated and blended, and, beside being developed to the highest point of solubility, the entire mass will have the same or a uniform measure of solubility, which a mixture composed of two different kinds of grain separately processed and afterward mixed will not have.

When dried as above described, the product will keep any length of time, and may be handled, stored, or transported conveniently.

It will be seen the method and the product are so kindred and related as to constitute a unitary invention. I therefore make claim to both.

I claim—

1. The herein-described process for the preparation of a cereal product from two or more kinds of cereals, consisting of removing the hull or outside cellular tissue and germ, cracking or breaking the grains, and then subjecting the mixed grains to the action of moisture and heat at alternating temperatures, so as to develop the starch, dextrine, and sugar equally of the several cereals and have them assimilated and combined.

2. The herein-described process for the preparation of a cereal product from two or more kinds of cereals, consisting of removing the hull or outside cellular tissue and germ, cracking or breaking the grains, then subjecting the mixed grains to the action of moisture and heat at alternating temperatures, so as to develop the starch, dextrine, and sugar equally of the several cereals and have them assimilated and combined, and then finally passing the grain particles through rolls or mills and drying.

In testimony whereof I affix my signature in the presence of two witnesses.

EMORY V. DONELSON.

Witnesses:
WM. T. HENDERSON,
JNO. T. MADDOX.